United States Patent

[11] 3,530,786

| [72] | Inventors | Roger Bellot;<br>Jean Bellot, both of 104 Rue de la Medoquine, Talence, Gironde; Jacques Miroir, Avenue John Fitzgerald Kennedy, Merignac, Gironde; Francois Bouteille, 27 Rue Paul Lacombe, Carcassonne, Aude, France |
|---|---|---|
| [21] | Appl. No. | 793,736 |
| [22] | Filed | Jan. 24, 1969 |
| [45] | Patented | Sept. 29, 1970 |

[54] SELF-EMPTYING HOMOGENIZING AND FERMENTATION VATS
7 Claims, 9 Drawing Figs.

[52] U.S. Cl. .................................................... 99/276
[51] Int. Cl. ..................................................... C12b 1/10

[50] Field of Search.......................................... 99/275,
276, 277, 277.1, 277.2, 278; 195/128, 132, 133, 135, 139; 99/52, 35, 36

[56] References Cited
UNITED STATES PATENTS

| 2,811,448 | 10/1957 | Rietz | 99/276X |
| 3,216,345 | 11/1965 | Rigby | 99/276 |
| 3,313,628 | 4/1967 | Schaus | 99/52 |
| 3,478,669 | 11/1969 | Lanes | 99/276 |

Primary Examiner—Robert W. Jenkins
Attorney—Karl W. Flocks

ABSTRACT: Self-emptying homogenization and fermentation vat applicable to wine-making, having a fixed or variable inclination about a horizontal transverse axis and a bottom provided at one end with a racking-off door with progressive opening. Cylindric vats may further rotate about their longitudinal axis.

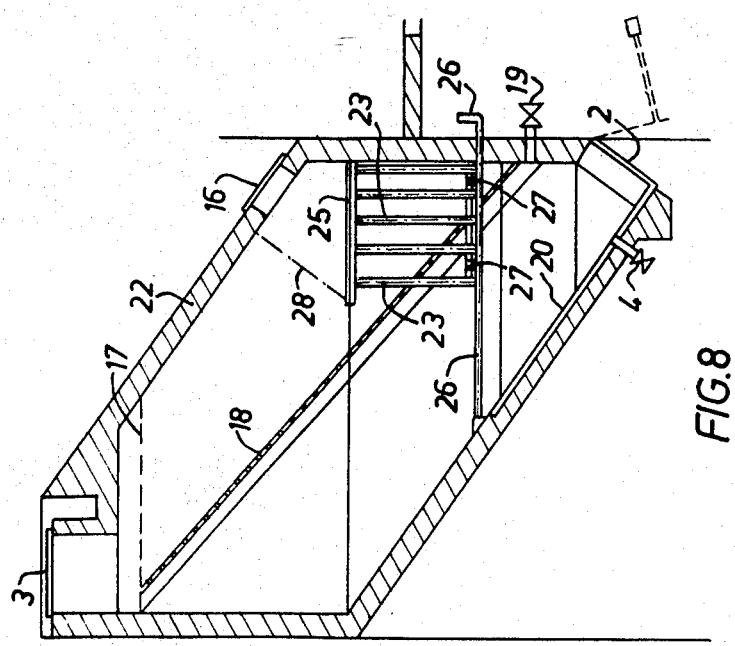
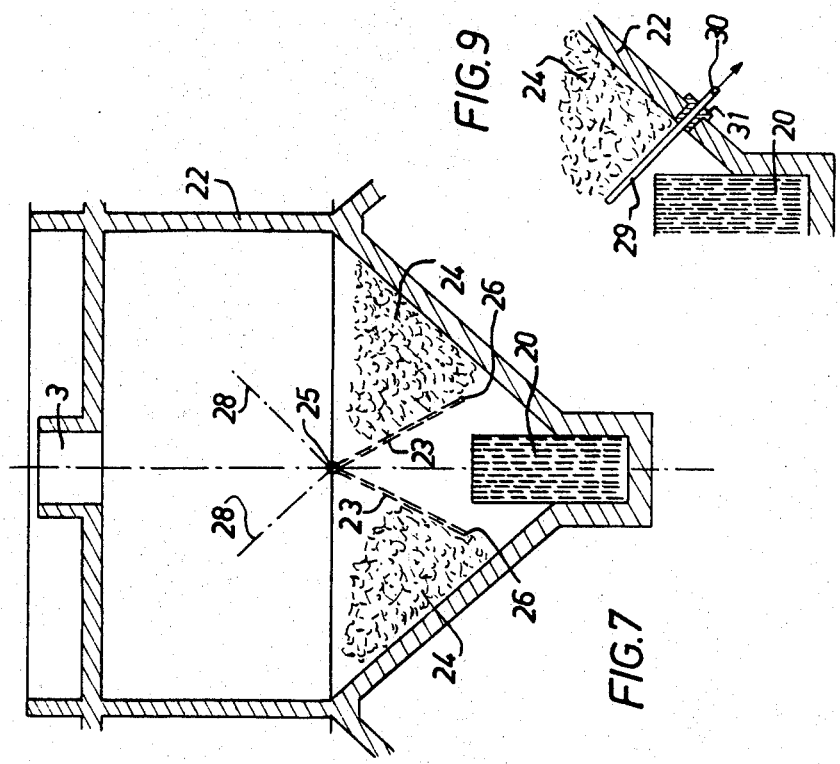

3,530,786

SELF-EMPTYING HOMOGENIZING AND FERMENTATION VATS

The present invention relates to self-emptying vats intended for the homogenization and fermentation of heterogeneous media applicable to alcoholic fermentations and especially to wine-making.

For the alcoholic fermentation of grapes for example, the effectiveness of controlled homogenization and emptying is variable and depends on the type of fermentation adopted.

The present invention is thus directed to vats which permit good homogenization of the solid and liquid phases to be obtained during the treatment, also permitting self-emptying after the evacuation of the liquid part, and comprising no internal mechanical members which are likely to interfere with the quality of the products obtained.

The vats according to the invention are essentially characterized by the fact that they have a fixed or variable inclination, especially of the bottom, in association with a racking-off door with a progressive opening, located at the lower portion.

According to other characteristic features:

The vats are provided with a draw-off orifice for liquid at their lower portion; and The bottoms of the vats may be surmounted by a filtering grid.

According to one form of construction, the vats in accordance with the invention may be movable about their longitudinal axis and/or about a horizontal transverse axis.

According to another form of construction, the vats are fixed, comprising a bottom inclined towards the racking-off door and are provided with at least one movable retention grid having an inclination controlled from the exterior if necessary, and with retractable lugs for fixing the said grid.

Other characteristic features and advantages resulting from the present invention will be more clearly brought out in the description which follows below of possible forms of construction of vats in accordance with the invention, this description being given with reference to the accompanying drawings, in which:

FIGS. 7 and 8 show respectively cross-sections in elevation and profile of a fixed vat provided with movable internal grids; and FIG. 9 shows as alternative form of a detail of FIG. 7.

Figure 1:
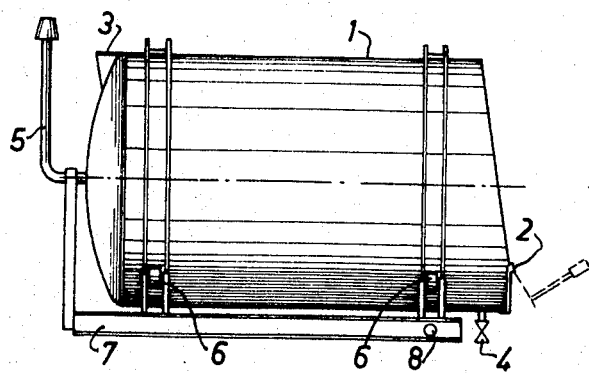
FIGS. 1 and 2 show respectively a view in profile and in cross-section of a vat which is movable about its longitudinal axis.

With reference to FIG. 1, a cylindrical horizontal homogenization or fermentation vat 1 comprises a door 2 with progressive opening, a filling and overflow orifice 3, an emptying orifice 4 and a safety vent 5.

This vat, mounted on supports or suspended, can be made rotatable about its longitudinal axis, for example by rolling on rollers 6, of which one row may be driven mechanically and mounted on a frame 7. This vat can also be tilted about the axis 8, in order to obtain a desired inclination for racking-off towards the door 2. The tilting of the vat can be effected by hand or again by mechanical, electrical, hydraulic or pneumatic means.

Figure 2:
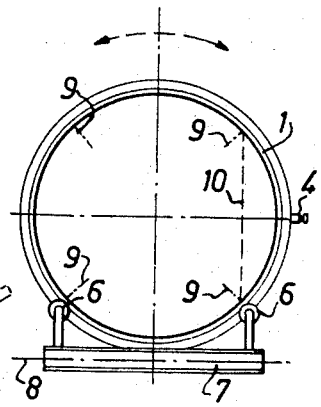

Referring now to FIG. 2, the vat 1 is provided in its interior with anti-surge members 9 and a grid 10.

After filling through the orifice 3, the vat 1 is given a continuous or discontinuous movement of rotation, according to requirements, and may be heated or cooled in known manner in order to bring the product or products introduced to the desired degree of homogenization. In particular, for the vinification of the red wine harvest, there are mixed together the various categories of grapes employed, the fermenting liquid when required, various incorporated solutions, and there can be obtained an absorption of the colour by maceration in the hot or cold state.

This vat can be utilized for the partial or complete vinification of the grape harvest and the housing of the wine.

The emptying of the contents of the vat 1 is effected through the orifice 4 and the door 2, after tilting the tank if necessary.

This door 2 with progressive opening is preferably that of the type described in French Pat. No. 1,439,116 and can be used with advantage to equip the other forms of construction of vats described below.

Figure 3:
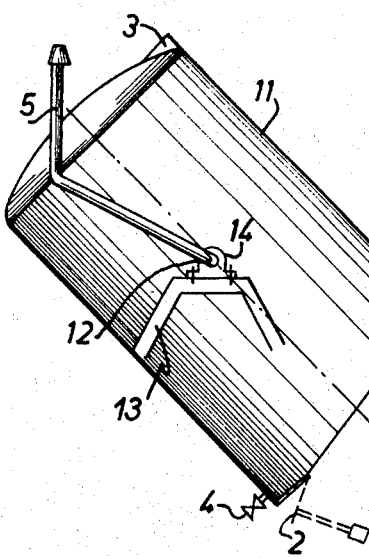
FIGS. 3 and 4 represent profile views of a vat arranged to tilt about a transverse axis.
Figure 4:
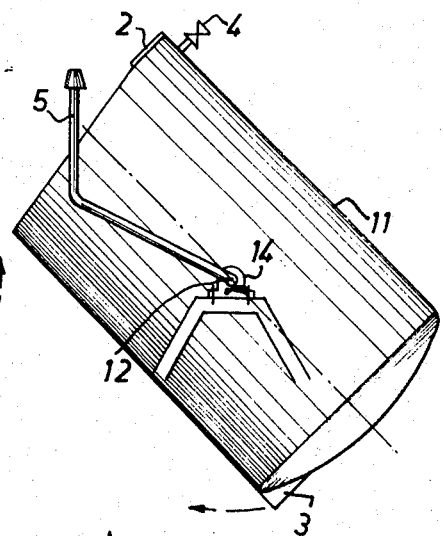

With reference to FIG. 3, a vat 11 can be placed in the vertical position and pivotally mounted on trunnions 12 with a horizontal axis, located approximately at the centre of gravity of the vat and resting on supports 13 with bearings 14.

In this form of construction, the safety device 5 is mounted on one of the axes 12, and the anti-surge members 9 may be dispensed with or may be given an appropriate profile.

After filling through the orifice 3, the vat 12 can tilt through 180° by manual or mechanical movements which may be alternating or continous.

As previously, there is thus obtained a homogenization of the contents of the vat without internal handling applied to the actual contents.

The emptying is effected through the orifice 4 and the door 2, while giving the desired inclination to the vat 11.

As in the previous case, this vat may be heated or cooled in known manner, and may be employed for the treatment of the grape harvest and also as a container for wine.

Figure 5:
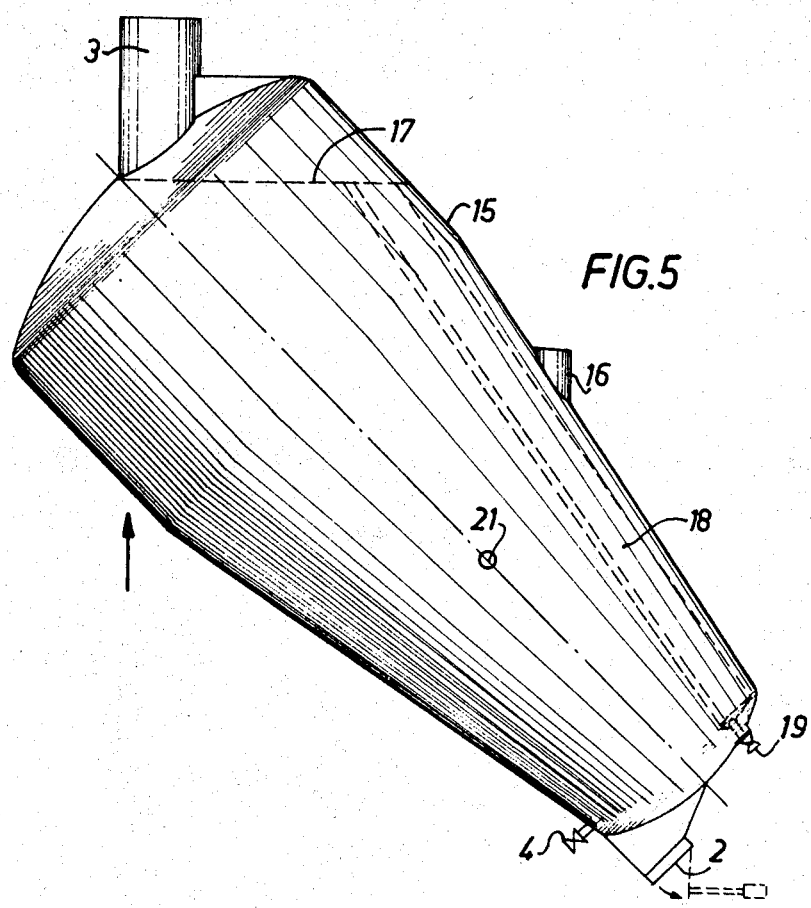
FIG. 5 shows another form of vat which is fixed or arranged to tilt about a transverse axis.
Figure 6:
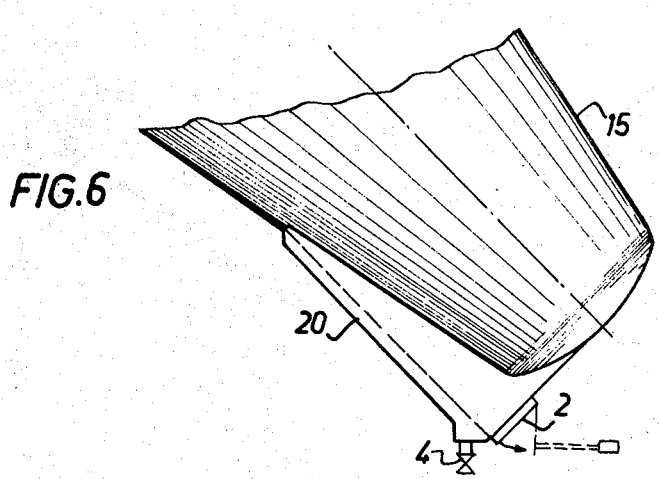
FIG. 6 shows a detail of FIG. 5.

Referring now to FIGS. 5 and 6, according to the invention there can be built an inclinable vat 15 having a cylindrical section at its upper portion and a conical section at its lower portion, with a door 2 having a progressive opening, overflow and filling orifices 3, emptying orifice 4, adaptable to one of the forms of construction described in French Pat. No. 1,548,637.

A vat of this kind comprises an inspection door 16 placed approximately at the mid-height, an upper grid 17, fixed or moving, for the immersion of the supernatant solid portions, a perforated drainage and raising chamber 18 having a draw-off cock 19 or, as shown in FIG. 6, with a lower grid 20, as described for example in French Pat. No. 1,510,140.

This vat is given a variable inclination by rotation about one or a number of pivots or suspension supports 21, by manual, mechanical, electrical or hydraulic operation.

The filling is effected through the orifice 3, preferably in the position of minimum inclination, and the emptying is effected through the door 2 with progressive opening, with the possibility of varying the degree of inclination according to the necessities of the emptying operation.

With reference to FIGS. 7 and 8, a self-emptying fixed vinification vat can be constructed, in which the angle of the floor cannot vary during the course of the operations, and is for example of a type also described in the above mentioned French Pat. No. 1,548,437.

As in the previous example, this vat is provided with a door 2 having a progressive opening at the lower portion, an overflow and filling orifice 3 at the lower portion, a draw-off orifice 4 at the lower portion, a grid for immersion when required of the solid constituents, a perforated raising and drainage chamber 20; it may be completed by any accessories previously specified in the above-mentioned patents.

In order to facilitate the racking-off of the solid contents of the vat 22, the slope of the floor may be a maximum towards the door 2 and, in order to prevent agglomeration round this door, the vat may be provided internally with one or more retention devices which provide a uniform intake of the solid materials, namely the marc 24 in the case of vinification of grapes.

This retention device may be constituted, for example:

By two grids 23 articulated on an upper shaft 25 and retained in the lower portion and in their closed position by two retractable shafts 26 provided with retaining lugs 27 and capable of being operated from the outside, the pivotal shaft 25 of these grids being secured on fixed or moving supports 28; and Or by one or more retractable grids 29 (see FIG. 9) fixed on an internal or external shaft 30 and sliding in packing-gland sockets 31.

After drawing-off the liquors through the orifice 4, the marc from vinification is divided into several portions stopped or slowed down by the grids 23 or 29 in their sliding movement towards the door 2. As soon as this becomes necessary, it is only necessary to free these grids one after the other by operation of the shafts 26 or 30 so as to liberate the marc which is behind the grids 23 and 29.

The vats as described above may of course be constructed from any appropriate materials, especially of metal, cement or plastic material, reinforced or not, and may comprise all the usual accessories together with all or part of the devices described in the above-mentioned French Pat. No. 1,510,140.

It will furthermore be understood that the present invention has been described and illustrated solely by way of explanation and not in any limitative sense, and that any useful modification can be made thereto without thereby departing from its scope.

We claim:

1. A self-emptying homogenization and fermentation vat applicable to wine-making, comprising:
   a main body having a form of revolution about a longitudinal axis and corresponding to the cylindrical and frusto-conical types;
   a bottom arranged along the lower portion of the lateral wall of said main body;
   a racking-off door with progressive opening, arranged at one extremity of said bottom;
   a liquid-flow orifice arranged at the lower portion of said bottom and at the extremity comprising said racking-off door; and
   a filtration grid arranged above said liquid-flow orifice, parallel to said bottom.

2. A self-emptying vat as claimed in claim 1, and further comprising lateral pivots permitting the rotation of said vat about a horizontal transverse axis.

3. A self-emptying vat as claimed in claim 1, and further comprising rolling means permitting the rotation of said vat about its longitudinal axis.

4. A self-emptying vat as claimed in claim 1, comprising lateral pivots permitting rotation of said vat about a horizontal transverse axis and rolling means permitting rotation of said vat about its longitudinal axis.

5. A self-emptying homogenization and fermentation vat applicable to wine-making, comprising:
   an upper body of parallelepiped shape;
   an inclined bottom;
   lower side walls inclined towards said bottom;
   a racking-off door with progressive opening at the lower extremity of said inclined bottom;
   a liquid-flow orifice at the lower portion of said inclined bottom;
   a filtration grid arranged above said liquid flow orifice parallel to the inclined bottom; and
   two internal retaining grids with an adjustable action, located above said inclined bottom, on each side of said progressively-opening door.

6. A self-emptying vat as claimed in claim 5, in which said grids are articulated on a common horizontal shaft having the same direction as the axis of said bottom and retained at their lower parts in the closed position by two retractable shafts adapted to be actuated from the exterior.

7. A self-emptying vat as claimed in claim 5, in which said grids are retractable and are fixed on a shaft sliding between the exterior and the interior of said vat through appropriate packing glands.